Patented June 29, 1954

2,682,556

UNITED STATES PATENT OFFICE 2,682,556

PROCESS FOR PREPARING VINYL FORMATE

Harry W. Coover, Jr., and Joseph B. Dickey, Kingsport, Tenn., assignors to Eastman Kodak Company, Rochester, N. Y., a corporation of New Jersey No Drawing. Application March 1, 1952, Serial No. 274,511

6 Claims. (Cl. 260—498)

This invention relates to a vapor phase process for the preparation of vinyl formate from acetylene and formic acid.

Vinyl formate readily homopolymerizes and copolymerizes to give polymers of commercial importance. Such resins are potentially important, for example, for producing color free and color stable polyvinyl resins for use in safety glass, and are produced by starting with polyvinyl formate instead of the usual acetate. The polyvinyl formate hydrolyzes and acetylizes much more rapidly and requires no catalyst.

The monomeric vinyl formate can be made by one or more of the known liquid phase methods for preparing vinyl esters such as the liquid phase reaction of acetylene with a carboxylic acid in the presence of a mercuric salt or by ester interchange reaction of formic acid with vinyl acetate. The ester interchange method under favorable conditions gives satisfactory yields of vinyl formate. However, the process is costly. The direct addition of formic acid to acetylene in the liquid phase and in the presence of small amounts of mercuric salts results in relatively poor yields of vinyl formate. One of the difficulties in this process is apparently the reduction of the catalyst to an insoluble mercurous salt by the formic acid. Attempts to make vinyl formate by vapor phase processes would be highly desirable, but to the present none have proven successful. For example, N. Platzer in "Modern Plastics" vol. 28, page 113-4 (Sept. 1950), reports that formic acid, in contradistinction to other homologous carboxylic acids, cannot be vinylated in the vapor phase over catalyst with acetylene.

We have now found, however, that vinyl formate can be prepared by a vapor phase process, in excellent yield and without the formation of the ethylidene ester, by carrying out the reaction of the acetylene with the formic acid over a suitable catalyst, in the presence of acetic anhydride.

It is, accordingly, an object of the invention to provide a new vapor phase process for preparing monomeric vinyl formate. Other objects will become apparent hereinafter.

In accordance with the invention, we prepare monomeric vinyl formate by passing a mixture of acetylene, formic acid vapor and a small amount of acetic anhydride vapor over a catalyst comprising a zinc or cadmium salt such as a zinc or a cadmium salt of a saturated fatty acid containing from 1 to 2 carbon atoms (e. g. zinc or cadmium formate, zinc or cadmium acetate, zinc or cadmium propionate, zinc or cadmium butyrate, zinc or cadmium valerate, zinc or cadmium laurate, etc.,) zinc or cadmium oxide, zinc or cadmium hydroxide, or mixtures thereof, supported on a porous support such as activated carbon, silica gel, pumice stone, but preferably charcoal pellets impregnated with one or more of the mentioned zinc and cadmium salts, at a temperature of from 150° to 260° C., preferably at from 170° to 210° C. The relative amounts of acetylene and formic acid in the gaseous mixture can be varied at will and the acetylene gas may be present in excess. The preferred ratios are from 5 to 12 gram-moles of acetylene per gram-mole of formic acid, although a ratio as low as 1:1 may be used. If the ratio of acetylene is greatly reduced, then conditions favor the formation of ethylidene ester. Advantageously, the gaseous mixture is first passed through a preheating chamber maintained at about 170° to 180° C., and then passed into the reaction chamber containing the catalyst, the vapors issuing therefrom being collected as condensates in Dry Ice traps. The vinyl formate product is then recovered in purified form by fractionation, etc. of the condensate. When the reaction is first started, there is an initial rise in temperature, but on continued operation the temperatures become steady. The reaction is exothermic, and the heat input necessary to maintain the temperature of the catalyst chamber at the proper level prior to introducing the reactants must be reduced when the reaction starts. We have also observed that the best results are obtained when the reaction has been under way several hours. The amount of acetic anhydride employed in the process of our invention, which is added preferably to the formic acid prior to its vaporization, can range from a slight excess over that required to react with any water that may be present in the formic acid, or, from about 0.01 to 0.1 mole of acetic anhydride to each mole of anhydrous formic acid. If an amount of acetic anhydride is used which is insufficient to react with all of the water present, the product is always contaminated with acetaldehyde and the yield of vinyl formate is greatly reduced. The rate of flow of the gaseous mixture comprising acetylene, formic acid and acetic anhydride over the catalyst is not critical, but can vary from about 1 to 5 moles/hour, preferably from 1.5–3 moles of gaseous mixture per hour.

The following example will serve further to illustrate our new process for preparing vinyl formate.

Example

Thoroughly washed and dried acetylene gas was passed at the rate of 1.7 moles/hour over liquid 98 per cent formic acid, containing 1.1 moles of acetic anhydride per mole of water in the formic acid, maintained at 25° C. The exposed area of liquid acid was 20 square inches. The vapor produced consisted of 5.1 parts by weight of acetylene and 1 part by weight of the liquid reactants. This mixture was then preheated by passage through a tube maintained at 180° C., after which the mixture was passed over the catalyst consisting of 145 cc. of charcoal pellets impregnated with zinc acetate (prepared by treating the charcoal pellets with a saturated aqueous solution of zinc acetate and drying at 100° C. for about 24 hours). The temperatures were measured in three zones of the catalyst and they were maintained as follows: top—170° C.; middle—200° C.; and bottom—195° C. The vaporous product issuing from the reaction chamber was collected in Dry Ice traps. The reaction was run for a period of 3 hours during which time, 4.59 moles of acetylene and 0.9 moles of acid vapor were passed through and 0.552 moles of vinyl formate were obtained. This calculates to a yield of 61.3 per cent. However, a total of 0.168 moles of unreacted formic acid were recovered so that the yield based on the actual acid used up in a single passage was 80 per cent.

In place of the zinc acetate catalyst in the above example, there can be substituted an equivalent amount of any of the other catalysts mentioned such as catalysts prepared with other zinc and cadmium salts of saturated fatty acids containing from 1 to 12 carbon atoms, zinc or cadmium oxide, zinc or cadmium hydroxide or mixtures thereof, to give similarly good yields of vinyl formate. While pure acetylene is preferred, mixtures of acetylene with minor portions of other gases which are inert to the present process such as methane, ethane, nitrogen, carbon dioxide, etc., can also be employed.

What we claim is:

1. A process for preparing vinyl formate which comprises reacting a mixture of acetylene and formic acid containing from 0.01 to 0.1 mole of acetic anhydride per mole of the formic acid, in vapor phase and in the presence of a catalyst comprising a porous support impregnated with a compound selected from the group consisting of a zinc salt of a saturated fatty acid containing from 1 to 12 carbon atoms, a cadmium salt of a saturated fatty acid containing from 1 to 12 carbon atoms, zinc oxide, zinc hydroxide, cadmium oxide and cadmium hydroxide, at a temperature of from 150° to 260° C. and separating the vinyl formate which forms from the reaction mixture.

2. A process for preparing vinyl formate which comprises reacting a mixture of acetylene and formic acid containing from 0.01 to 0.1 mole of acetic anhydride per mole of formic acid, in vapor phase, and in the presence of a catalyst comprising a porous support impregnated with zinc acetate, at a temperature of from 150° to 260° C. and separating the vinyl formate which forms from the reaction mixture.

3. A process for preparing vinyl formate which comprises reacting a mixture of acetylene and formic acid containing from 0.01 to 0.1 mole of acetic anhydride per mole of formic acid, in vapor phase and in the presence of a catalyst comprising charcoal pellets impregnated with zinc acetate, at a temperature of from 150° to 260° C., and separating the vinyl formate which forms from the reaction mixture.

4. A process for preparing vinyl formate which comprises reacting a mixture of acetylene and vapors of formic acid containing from 0.01 to 0.1 mole of acetic anhydride per mole of formic acid, in vapor phase and in the presence of a catalyst comprising charcoal pellets impregnated with zinc acetate, at a temperature of from 170° to 210° C., and separating the vinyl formate which forms from the reaction mixture.

5. A process for preparing vinyl formate which comprises reacting acetylene and formic acid containing from 0.01 to 0.1 moles of acetic anhydride per mole of formic acid, in the proportions of from 5 to 12 gram-moles of acetylene to each gram-mole of the formic acid, in vapor phase and in the presence of a catalyst comprising charcoal pellets inpregnated with zinc acetate, at a temperature of from 170° to 210° C., and separating the vinyl formate which forms from the reaction mixture.

6. A process for preparing vinyl formate which comprises passing dried acetylene gas at the rate of 1.7 gram-moles/hour over liquid 98 per cent formic acid containing 1.1 gram-moles of acetic anhydride per gram-mole of water in the formic acid and maintained at 25° C., heating the gaseous mixture produced to 180° C. and passing it over a catalyst comprising a porous support impregnated with zinc acetate and heated to a temperature of from 170° to 200° C., and separating the vinyl formate which forms from the reaction mixture.

References Cited in the file of this patent

UNITED STATES PATENTS

| Number | Name | Date |
|---|---|---|
| 1,666,482 | Baun et al. | Apr. 17, 1928 |
| 1,822,525 | Herrmann et al. | Sept. 8, 1931 |

FOREIGN PATENTS

| Number | Country | Date |
|---|---|---|
| 351,318 | Great Britain | June 25, 1931 |